Oct. 4, 1966     D. P. EPSTEIN     3,276,146
ANATOMICAL MODEL OF BRAIN
Filed March 2, 1964     4 Sheets-Sheet 1
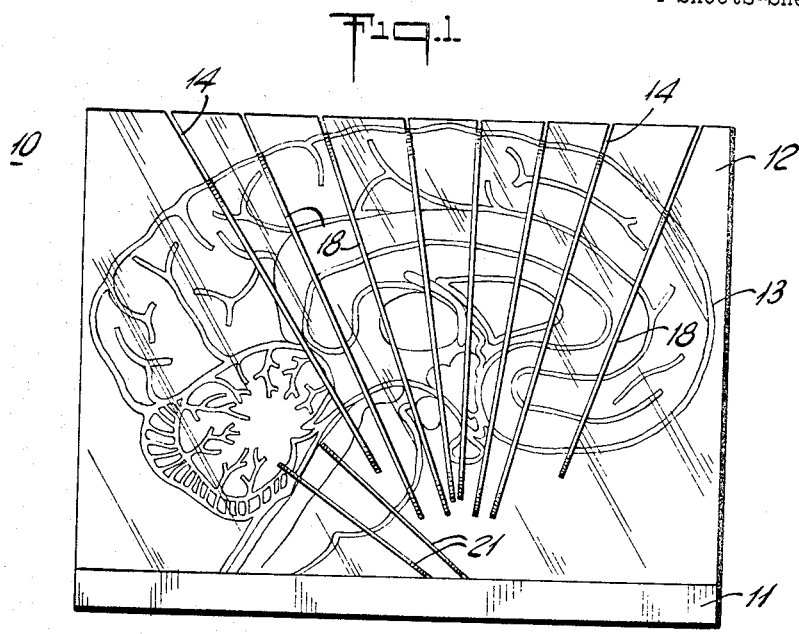
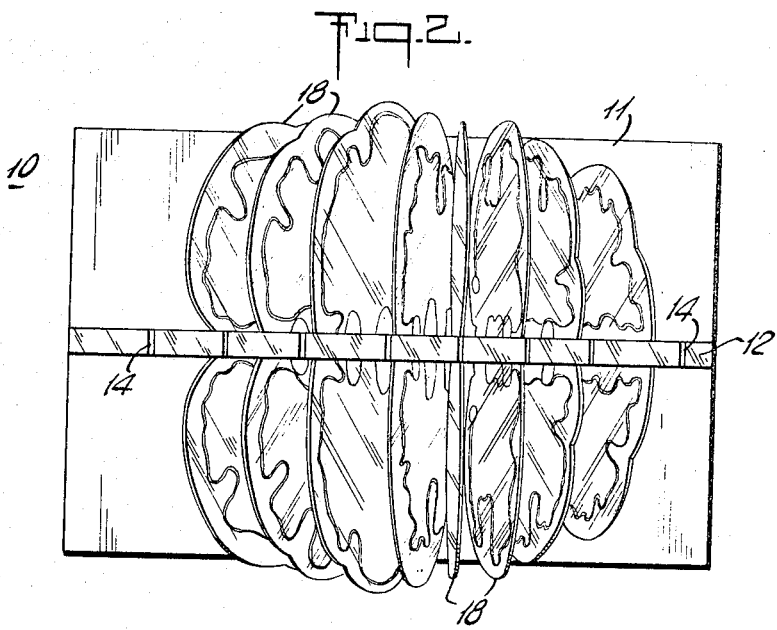
INVENTOR
DAVID P. EPSTEIN
BY Stanley Wolder
ATTORNEY Oct. 4, 1966 D. P. EPSTEIN 3,276,146
ANATOMICAL MODEL OF BRAIN
Filed March 2, 1964 4 Sheets-Sheet 2
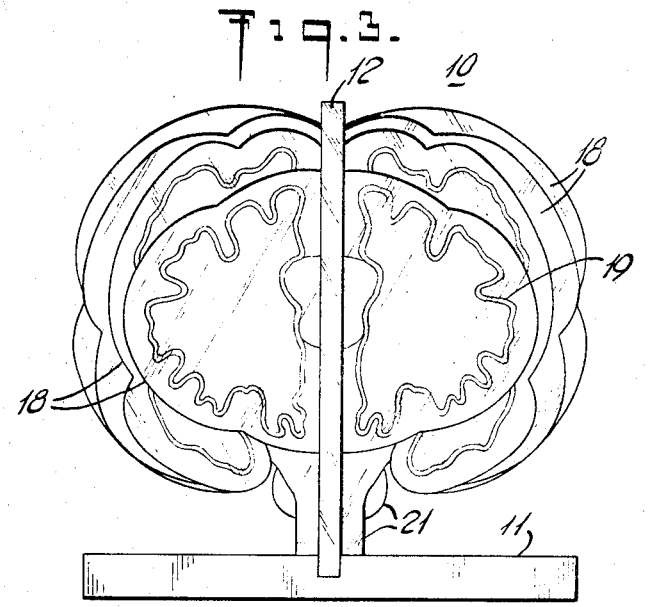
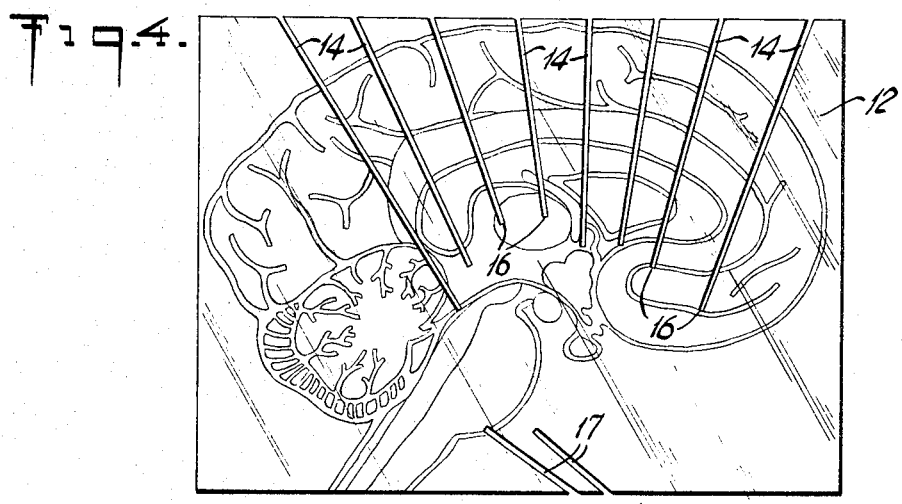
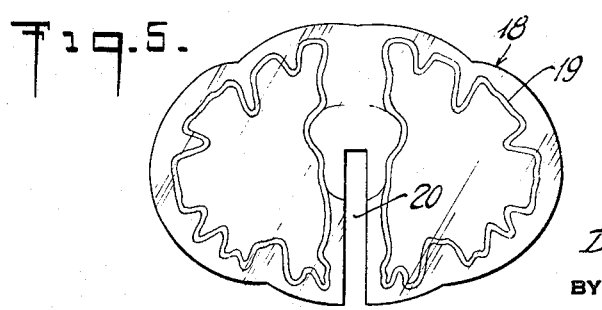
INVENTOR
DAVID P. EPSTEIN
BY Stanley Wolder
ATTORNEY Oct. 4, 1966  D. P. EPSTEIN  3,276,146
ANATOMICAL MODEL OF BRAIN
Filed March 2, 1964  4 Sheets-Sheet 3
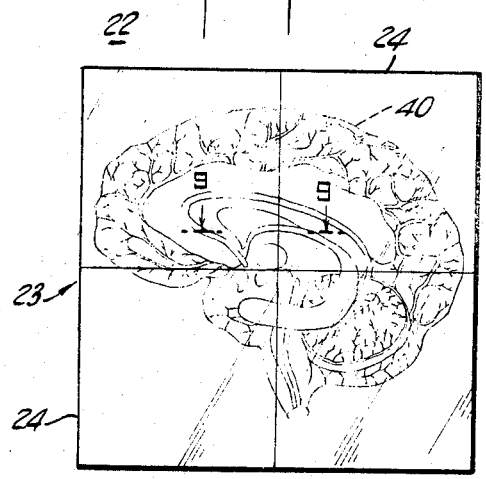
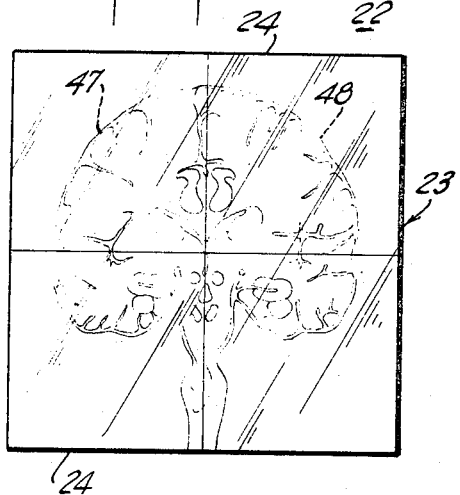
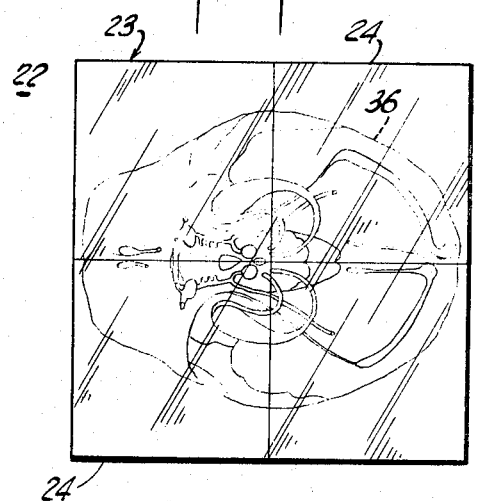
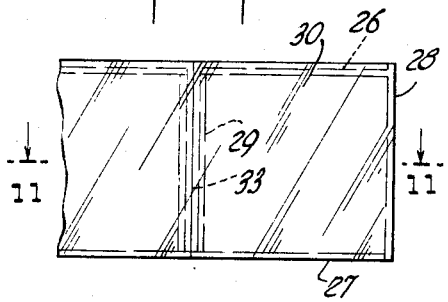
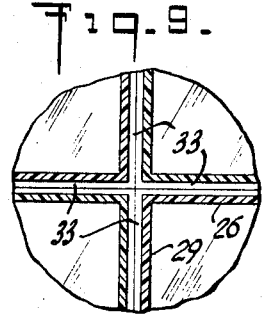
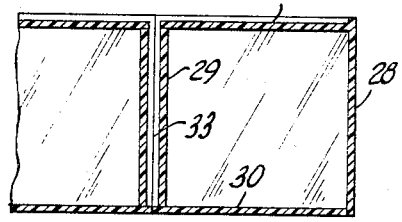
INVENTOR
DAVID P. EPSTEIN
BY Stanley Walder
ATTORNEY Oct. 4, 1966  D. P. EPSTEIN  3,276,146
ANATOMICAL MODEL OF BRAIN
Filed March 2, 1964  4 Sheets-Sheet 4

INVENTOR
DAVID P. EPSTEIN
BY Stanley Wolder
ATTORNEY

United States Patent Office 3,276,146
Patented Oct. 4, 1966

3,276,146
ANATOMICAL MODEL OF BRAIN
David P. Epstein, Irvington, N.Y., assignor to William Douglas McAdams Inc., New York, N.Y., a corporation of New York
Filed Mar. 2, 1964, Ser. No. 348,574
13 Claims. (Cl. 35—17)

The present invention relates generally to improvements in educational and display devices and it relates more particularly to an improved anatomical model.

Anatomical models are widely employed in teaching and explaining the structure and functioning of a wide variety of biological organs. While the use of conventional anatomical models are suitable for many applications when employed in connection with complex organs, as typified by the brain, they possess numerous drawbacks and disadvantages. Where the illustrated organ is of a multifunctional nature containing a large number of distinct parts the conventional anatomical model does not afford a highly informative representation. It is important, in connection with these complex organs that a composite model of the organ provide visual access to the internal structure thereof. While anatomical models have been proposed and available which permit a viewing of the interiors thereof they have been awkward, and expensive devices, often confusing and of limited application and otherwise leaving much to be desired.

It is thus a principal object of the present invention to provide an improved educational and display device.

Another object of the present invention is to provide an improved anatomical model.

Still another object of the present invention is to provide an improved anatomical model of a biological organ or life form which presents a view of the organ as a whole and affords visual representation of the interior parts thereof in accurate spatial relationship.

A further object of the present invention is to provide an improved three dimensional anatomical model of the brain in which various sections of the brain are presented.

Still a further object of the present invention is to provide an improved anatomical model of the above nature which may be readily assembled and disassembled thereby facilitating the distribution and storage thereof and characterized by its simplicity, low cost and highly attractive appearance.

The above and other objects of the present invention will become apparent from a reading of the following description taken in conjunction with the accompanying drawings, wherein:

FIGURE 1 is a front elevational view of an anatomical model of the human brain embodying the present invention;

FIGURE 2 is a top plan view thereof;

FIGURE 3 is an end elevational view thereof;

FIGURE 4 is a front elevational view of a longitudinal panel section of the anatomical model;

FIGURE 5 is an elevational view of a transverse panel section of the anatomical model;

FIGURE 6 is a front elevational view of another embodiment of the present invention;

FIGURE 7 is an end elevational view thereof;

FIGURE 8 is a top plan view thereof;

FIGURE 9 is an enlarged fragmentary sectional view taken along line 9—9 in FIGURE 6;

FIGURE 10 is a front elevational view of a block section of the body member;

FIGURE 11 is a sectional view taken along line 11—11 in FIGURE 10;

Figure 12:
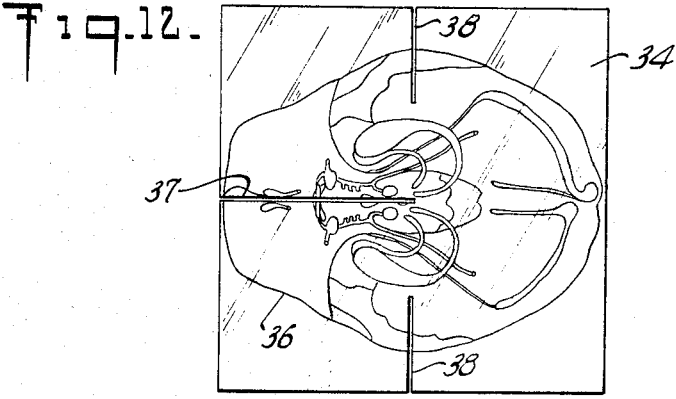
FIGURE 12 is a plan view of the horizontal section panel of the anatomical model.

In a sense the present invention contemplates the provision of an anatomical model comprising a longitudinally extending first panel, and a plurality of longitudinally spaced second panels projecting transversely from said first panel and having representations thereon illustrating the corresponding related cross sections of a predetermined organ.

According to a preferred form of the present invention as applied to the human brain, there is provided a base member which releasably supports the longitudinally extending first panel in an upright position, the first panel carrying a representation of the medial sagittal section of the brain. A plurality of longitudinally spaced downwardly converging slots are formed in the first panel and extend from the top thereof to points above the bottom. The second panels have peripheral shapes of the corresponding coronal sections of the brain and carry representations of the respective brain sections. Each of the second panels separably registers with a predetermined one of the first panel slots and is provided with a slot extending from the bottom thereof which engages the first panel. In accordance with another form of the present device there is provided a cubic body member formed of eight similar interfitting transparent cubes of half the dimensions of the body member, the cubes having confronting faces along three mutually perpendicular medial planes. Sandwiched between the cube confronting faces are panels carrying representations respectively of the medial sagittal, medial coronal and medial horizontal sections of the brain.

Referring now to the drawings and particularly to FIGURES 1 to 5 thereof which illustrate a preferred embodiment of the present invention, the reference numeral 10 generally designates the improved anatomical model which represents the human brain. The model 10 includes a horizontal rectangular base plate 11 having formed in its top face a medially disposed longitudinally extending groove. A longitudinally extending vertical panel 12 is supported by the base plate 11 and has its lower border separably engaging the longitudinal groove.

The longitudinal panel 12 is relatively thick and of rectangular configuration and is formed of any suitable material, advantageously a clear transparent thermoplastic resin such as Lucite, polystyrene or the like. Carried on one or both opposite faces of the panel 12 is a representation 13 of the medial sagittal section of the human brain. The representation 13 may be applied directly to the faces of the panel 12 such as by any well known printing process or may be similarly applied to transparent films which in turn are cemented or otherwise adhered to the faces of the panel 12. The representation 13 is advantageously multicolored, different parts of the brain being illustrated in different colors to facilitate the identification of the respective parts and provide a more attractive appearance. Among the section parts of the brain shown on the panel 12 are the cerebrum, the cerebellum, the medulla oblongata, the pons, etc.

Formed in the upper section of the panel 12 are a plurality of longitudinally spaced narrow transverse coupling slots 14 which converge downwardly from the upper edge of the panel. The slots 14 terminate at base points 16 which preferably, but not necessarily, lie along a line about midway between the upper and lower edges of the representation 13. A pair of relatively short inclined slots 17 extend from the bottom edge of the panel 12 to approximately the representation 13.

Separably supported by the longitudinal panel 12 and engaging corresponding coupling slots 14 are a plurality of longitudinally spaced downwardly converging vertically extending transverse panels 18 having thicknesses approximately or slightly less than the width of the slots 14 and formed of any suitable material, preferably one similar to that of the panel 12. Each of the panels 18 has the peripheral configuration of the corresponding coronal section of the brain and carries representations 19 depicting the respective coronal section. The panels 18 have slots 20 formed therein extending medially upwardly from the lower edges of the panels 18 to about the midpoint thereof and being of a width approximately the thickness of the panel 12. In the assembled condition of the panels 12 and 18, the section of each panel 18 vertically above the respective slot 20 registers with a corresponding slot 14 and the slot 20 engages the panel 12 below the slot base 16, the inner ends of the coupling slots 14 and 20 being in substantial abutment. The upper medial edges of the panels 18 preferably intersect the upper border of the sagittal section representation 13.

The coronal section representations 19 mate the sagittal section representation 13 so as to present a complete picture of the brain with the various sections thereof visually accessible in the assembled form and being accurately and properly associated and related. An individual coronal section may be more closely examined by merely vertically slidably separating a corresponding transverse panel 18 from the longitudinal panel 12. A clear view of the sagittal section representation 13 is available from the front of the anatomical model 10 since it is substantially unimpeded by the transverse panels 18. The coronal section representations 19 may be applied to the panels 18 in the manner the representations 13 are applied to the panel 12.

A pair of slotted lower transverse panels 21 interfit with the lower coupling slots 17. The panels 21 like the transverse panels depict corresponding lower coronal sections of the respective parts of the brain.

The anatomical model 10 may be compactly packaged such as in kit form to facilitate the distribution, transportation and storage thereof by packaging the base 11 and the panels 12, 18 and 21 in an unassembled condition. In assembling the anatomical model 10, the panels 21 are inserted into the lower coupling slots 17 in the manner earlier described and the lower border of the panel 12 brought into engagement with the medial groove in the base 11. Thereafter, the transverse panels 18 are inserted into mating engagement with corresponding coupling slots 14 to complete the assembly.

Figure 13:
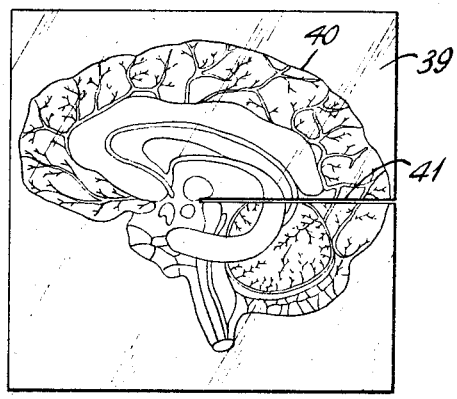
FIGURE 13 is a plan view of the sagittal section panel.
Figure 14:
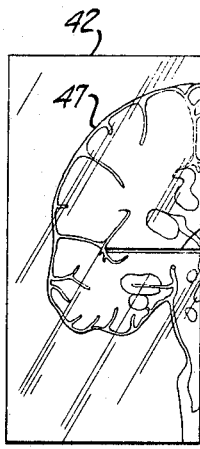
FIGURES 14 and 15 are plan views of the complementary medial coronal section panels.
Figure 15:
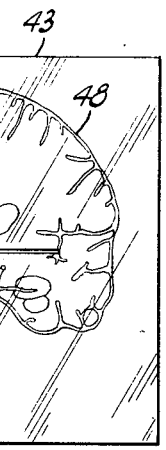

In FIGURES 6 to 15 of the drawings there is illustrated another embodiment of the present invention, in the form of an anatomical model 22 of the human brain. The model 22 includes a transparent cubic body member 23 formed of interfitted, similar, hollow transparent cubes 24 each having one half the dimensions of the body member 23 and arranged so that their confronting faces delineate three mutually perpendicular medial planes parallel to the respective edges of the body member 23. The cubes 24 are advantageously formed of a clear thermoplastic resin such as Lucite (polymethylmethacrylate), polystyrene or the like.

Each of the cubes 24 is of the construction of that illustrated in FIGURES 10 and 11 which represent the forward upper right corner cube, it being understood that by reorienting the cube 24 it may occupy any corner of the body member 23. The cube 24 includes upper and lower walls 26 and 27, respectively, an outer side wall 28 depending from the outer edge of the top wall 26 to a point slightly below the level of the bottom wall 27, an inner side wall 29 depending from the top wall 26 along a line slightly outwardly offset relative to the inner edge of the top wall 26 to the bottom wall 27, a front wall 30 extending from the front edge of the side wall 28 along the full length of the front edge of the top wall 26, and a rear wall 32 extending inwardly from the side wall 28 from a line slightly offset from the edge thereof to the rear edge of the side wall 29. Eight of the cubes 24 are interfitted to form the body member 23 and are each oriented so that the corner delineated by the walls 26, 28 and 30 forms a corner of the body member 23. Accordingly, by reason of the inwardly offset of the walls 27, 29 and 32, the body member 23 is provided with closed end relatively flat intersecting housing areas 33 which are substantially coextensive with the medial horizontal plane, the medial longitudinal plane and the medial transverse plane of the body member 23. The cubes 24 are secured to each other in any suitable manner (including for example their connection by transparent pressure sensitive tape) to effect the assembly of the body member 23.

Located in the horizontal medial housing area 33 and substantially coextensive therewith is a first panel 34 having printed thereon or otherwise applied thereto a representation 36 of the medial horizontal section of the human brain. A medially located longitudinal slot 37 is formed in the panel 34 and extends from an edge thereof to a point slightly beyond the center of the panel and a pair of medially located aligned transverse slots 38 extend from opposite longitudinal edges of the panel 34 to points short of the slot 37. A second panel 39 is located in the longitudinal vertical housing area 33 and is substantially coextensive therewith and has printed thereon or otherwise applied thereto a representation 40 of the medial sagittal section of the human brain. A medial longitudinal slot 41 is formed in the panel 39 and extends slightly past the mid-point on the panel 39. The panels 34 and 39 interfit and are mutually perpendicular, the slot 37 engaging the medial longitudinal section of the panel 37 opposite the slot 41 and the slot 41 engaging the medial longitudinal section of the panel 34 opposite the slot 37.

A pair of complementary panels 42 and 43 are located in transversely opposite sections of the transverse medial housing area 33 on opposite sides of the longitudinal medial housing area 33 and are substantially coextensive therewith. The panel 42 registers with one of the horizontal panel slots 38 and is provided with a transverse medial slot 44 engaging the adjacent section thereof and the panel 43 registers with the other of the horizontal panel slots 38 and is provided with a transverse medial slot 46 engaging the adjacent section of the panel 34. The inner endges of the panels 42 and 43 substantially abut the faces of the panel 39 and imprinted or otherwise applied to the faces of the panels 42 and 43 are representations 47 and 48 of the opposite halves of the medial coronal section of the brain.

It should be noted that the representations 36, 40, 47 and 48 of the various brain sections are so related in the assembled model as to present an accurate picture of the corresponding brain sections and their association. Further, the panels 34, 39, 42 and 43 are advantageously formed of a transparent foil such as cellulose acetate, Mylar or the like and while each of the panels are illustrated as being of a single layer they may be multi-ply with each layer being suitably imprinted.

The anatomical model 22 last described is very attractive and provides an easily observable and highly informative picture of the human brain.

While there have been described and illustrated preferred embodiments of the present invention, it is apparent that numerous alterations, omissions and additions may be made without departing from the spirit thereof.

What is claimed is:

1. An anatomical model comprising a longitudinally extending first panel having a first representation thereon illustrating the corresponding longitudinal cross section of a predetermined organ, and a plurality of longitudinally spaced second panels projecting transversely from said first panel and having second representations thereon illustrative of the corresponding transverse cross sections of said organ and correspondingly related to said first representation.

2. An anatomical model comprising a longitudinally extending first panel having a first representation thereon illustrating the corresponding longitudinal cross section of a predetermined organ, and a plurality of longitudinally spaced second panels projecting transversely from said first panel and being of the peripheral shapes and having second representations therein illustrative of the corresponding transverse cross sections of said organ and correspondingly related to said first representation.

3. An anatomical model comprising a base member, a longitudinally extending first panel directed upwardly from said base member and having a first representation thereon illustrating the corresponding longitudinal cross section of a predetermined organ, and a plurality of longitudinally spaced second panels projecting transversely from said first panel and having second representations thereon illustrative of the corresponding transverse cross sections of said organ and correspondingly related to said first representation.

4. An anatomical model comprising a longitudinally extending vertical first panel having formed therein longitudinally spaced first slots extending from the upper edge thereof to points above the bottom edge thereof and having a first representation thereon illustrating the corresponding longitudinal cross section of a predetermined organ, and a plurality of longitudinally spaced transversely extending second panels separably registering with said slots and having second representations thereon illustrative of the corresponding transverse cross sections of said organ and correspondingly related to said first representation.

5. The anatomical model of claim 4 wherein said second panels have second slots formed therein extending vertically from the bottoms of said second panels to points short of the tops thereof and engaging said first panel along areas extending below the upper edges of said first slots.

6. The anatomical model of claim 5 wherein said first panels, and said first slots are upwardly diverging.

7. The anatomical model of claim 4 including a base member having a longitudinally extending groove formed therein, the lower border of said first panel separably engaging said groove.

8. The anatomical model of claim 4 wherein said first representation is a sagittal section of the brain and said second representations are coronal sections of the brain.

9. The anatomical model of claim 8 wherein said second panels have peripheral borders corresponding to the respective brain coronal sections.

10. An anatomical model comprising a plurality of interfitting transparent sections forming a main transparent body member and having pairs of confronting faces lying along angularly related planes and representations of correspondingly related cross sections of an anatomical member disposed between respective of said confronting faces.

11. An anatomical model comprising a plurality of interfitting similar transparent cubes defining a transparent main cubic body member and having confronting faces delineating three mutually perpendicular medial planes of said body member and representations of corresponding mutually perpendicular cross sections of an anatomical member disposed along respective of said body member medial planes.

12. An anatomical model comprising a plurality of interfitting similar transparent cubes defining a transparent main cubic body member and having confronting faces delineating three mutually perpendicular medial planes of said body member, and transparent panels disposed between said confronting faces and carrying representations of corresponding mutually perpendicular cross sections of an anatomical member.

13. An anatomical model as described in claim 12, said anatomical member being a human brain.

References Cited by the Examiner

UNITED STATES PATENTS

| 1,141,480 | 6/1915 | Murayama | 35—17 |
| 1,478,058 | 12/1923 | Pope | 35—20 |
| 2,971,271 | 2/1961 | Goldenthal | 35—17 |
| 3,064,365 | 11/1962 | Ganine | 35—26 |
| 3,212,189 | 10/1965 | Savit | 35—41 X |

FOREIGN PATENTS

| 173,684 | 1/1922 | Great Britain. |
| 248,012 | 1/1948 | Switzerland. |

EUGENE R. CAPOZIO, *Primary Examiner.*

H. S. SKOGQUIST, *Assistant Examiner.*